2,977,232
METHOD OF MAKING BUTTER FROM MILK AND CREAM

Albert Meyer, Ludwigshafen (Rhine), and Georg Weck, Buhl, near Gunzburg, Germany, assignors to Hagan Chemicals & Controls, Inc., Pittsburgh, Pa., a corporation of Pennsylvania No Drawing. Filed Feb. 10, 1958, Ser. No. 714,063

5 Claims. (Cl. 99—119)

To obtain butter fat for the production of butter from whole milk, it is necessary to centrifuge the whole milk so that it is separated into skim milk and cream, the latter containing from about 20–50% fat. The products thus obtained are subsequently pasteurized at a temperature ranging from 70°–95° C. and they are then further processed in the usual manner to make butter or cheese. These processes can, however, be carried out only when sweet, whole milk (6.8–7.2° SH) are used. If the milk has become slightly sour through storage (8–11.5° SH) or truly sour (about 11.5° SH) the milk casein coagulates in the pasteurization or similar thermal treating process. Furthermore, in processing in the centrifuge, such a large amount of curd settles that after a short time of processing, the centrifuge clogs so much that further separation is rendered impossible.

Additionally, it has been found that the plates of the pasteurizer become coated with a large amount of milk stone which consists of coagulated and denatured milk albumen. Thus great losses of milk and of fat contained therein occur as the processing of slightly sour or sour milk has been attempted. To the best of our knowledge, the processing of slightly sour or sour milk could not be accomplished to produce high-grade butter and cheese products. In these cases, the slightly sour or sour milk was subjected to a steam treatment whereby the milk fat was separated as molten butter which was skimmed off and sold as a cheap "butter lard" while the casein was used in the main only for animal feed or industrial purposes. This entailed great commercial losses.

According to this invention, our new process consists of treating milk which is slightly sour or sour by adding small amounts of physiologically tolerable salts in sufficient concentration to buffer the free acid which is present predominantly as lactic acid, so that no deflocculation of milk casein can take place while the slightly sour or sour milk is undergoing pasteurization. Especially valuable in this application are the alkali salts such as disodium phosphate, sodium citrate, trisodium citrate, sodium tartrate, sodium pyrophosphates, and sodium polyphosphates, the pH of which salts in aqueous medium lies between 7.5 and 12.0 or even still higher. Due to the buffering of the pH value of the milk by the addition of such salts, mixtures of milk or cream do not have to pass over into the alkaline pH range themselves. The process is, however, by no means restricted to alkali salts as we may use other physiologically tolerable salts and/or salt-like compounds of the already named acids, e.g. organic bases can be used. The additions can exist also as double or complex salts such as sodium calcium citrate or sodium calcium phosphate. It is especially advantageous to take such salt mixtures the cations of which are in the same physiological ratio as exists in the milk.

If for instance, disodium phosphate is used, the addition to whole milk is at 8° SH (Soxhlet-Hinkel value) of about 0.4 g., and at 14.5° SH, 1.45 g. per liter of whole milk. The compounds used whether they be salts or salt mixtures must be soluble in aqueous solutions or at least they must become soluble in contact with lactic acid-containing media, or must permit the origination of the required additions as dissolved and/or soluble salts.

Especially recommended as a salt addition are mixtures of disodium phosphate with basic-reacting citrates in about a ratio of 1:1. Although the citrates dissolve the coagulated milk casein faster than the phosphates, a considerably more favorable action is shown in the mixture. Advantageous also is the use of salts and/or buffer salts of other physiologically tolerated acids, as for example, alkali salts of the ascorbic acids or amino acids. The addition of the named salts or salt mixtures stabilizes, surprisingly enough, the milk casein in milk and cream so that not only is the milk casein not precipitated even with vigorous thermal treatment (e.g. boiling) but even where milk casein has flocculated, it is liquefied again and thus slightly sour to sour milk, including cream, is rendered useful for the production of butter and/or cheese. This means a great economic value is made available to the entire dairy industry.

This process is by no means limited to whole milk. All types of milk, that is skim milk, butter milk, or concentrates containing milk casein, as for instance sweet and sour cream, can be subjected to this process. This results in additional great advantage to the dairy industry because it is now possible to liquefy flocculated milk casein from slightly sour to sour buttermilk (which contains about 0.3 to about 1% butter fat) by the addition of our preferred salts according to this invention, thereby obtaining from buttermilk thus treated through centrifuging, butter fat in the form of cream. Prior to this discovery, such a result had not been possible. Cream thus obtained can be further processed in automatic machinery such as a "Fritz" automat, to produce sweet cream butter after artificial or natural acidification in churning apparatus to sour cream butter, or after acidification and renewed treatment by the process according to this invention in automats, to a product which could be called according to its character "sour cream butter." The thus obtained fully centrifuged buttermilk is of a thin consistency due to the added salts and can be used directly or mixed with other milks for the production of cheese. Sour cream butter could not previously be produced in automats such as the "Fritz" machine. Butter produced in automats generally is a sweet cream butter which has a different taste than the usual sweet cream butter obtained from churning apparatus and the amounts which can be sold are limited. The sour cream butter, or a product which has the same characteristics, has a better storing capacity compared with other kinds of butter. On the basis of these facts, for years it has been the endeavor of the dairy industry to produce a sour cream butter in these automats. All attempts in this direction failed because the sour cream was simply too thick and could not pass through the automat in spite of every effort.

The new process which now permits production of butter with the characteristics of a sour cream butter in automats has still further technical advantages. Until this time it had been necessary to wash the butter made by the known processes with great care to make it fit for storage. The kinds of butter made by the new process which we have discovered need not be washed at all and will be found to have excellent keeping properties and excellent taste which means in many respects a great improvement in the butter producing and butter storing plants.

According to our novel process, the cream is adjusted to the fat percentages of 42–50%, preferably 44–48%, for subsequent processing in "Fritz" and "Westphalia" automats. In the case of cream to be processed in "Alpha" automats, the fat percentage is from about 80-85%. The cream is permitted to ripen thoroughly in cream agers as usual and then is transformed again into the consistency of a sweet cream by means of the additions according to this invention, in the form of solutions of the salts or salt mixtures with a pH of about 9 so that the sour cream can be made into butter in the same way as sweet cream in automats. In carrying out the process it is especially advantageous if the milk used for the production of butter including the cream, is buffered by means of the described additions to a pH between 6.25 and 6.45.

The invention will be more readily understood by those skilled in the art by referring to the following examples:

*Example 1*

To 100 liters of cooled sour cream with a butterfat content of 45%, about 100 grams of a salt such as dipotassium phosphate or trisodium citrate or mixtures of these is added with vigorous stirring. These salts are added to the cream in an aqueous solution which has a pH value adjusted in the range of between 8 and 9, the solution being quite concentrated. After about 3 minutes of vigorous agitation with the aqueous solution of the named salts, the sour cream is transformed into sweet cream and can be placed in the automat.

*Example 2*

To 100 liters of buttermilk with a fat content of about 0.35% obtained by the customary sour cream process, a concentrated solution containing a mixture of equal parts of sodium tripolyphosphate and trisodium citrate is added and is thoroughly mixed until such time as the buttermilk attains a pH value of about 5.80 to about 6.35. The buttermilk assumes a liquid characteristic and is separated in the usual manner after heating to 30° C. The yield of sweet cream having a fat content of about 22% is 15 liters. This sweet cream can be processed both in the usual manner or by using the process according to this invention to convert it into sweet cream butter or sour cream butter, while the buttermilk, because of its liquid quality, can be directly mixed with other kinds of milk for the production of cheese. It is particularly advantageous if the milk used for the production of cheese is buffered to a pH of about 5.5 to about 6.35 by means of the salts hereinbefore set forth.

*Example 3*

To 1000 liters of buttermilk having a fat content of 0.35% obtained by the customary sour cream process, a concentrated solution containing a mixture of equal parts of sodium tetrapolyphosphate and trisodium citrate is added and the mixture is agitated thoroughly until the buttermilk attains a pH of 6.3. The buttermilk takes on a liquid characteristic and after heating to 30° C. is centrifuged so that a cream of 46% fat content is separated. This cream can be processed directly to sweet cream butter in a "Fritz" automat. It is also possible to acidify the cream by well known methods and to liquefy it by addition of a concentrated aqueous solution of disodium phosphate and dipotassium phosphate (mixture of equal parts of both) until a pH value of 6.3 results and thereafter to process it in a "Fritz" automat to a product characterized by having the qualities of a sour cream butter.

*Example 4*

1000 liters of whole milk (SH of 14.5°) are rendered boiling-proof by 1.45 kilograms of disodium phosphate (boiling test) whereupon the milk is processed further in exactly the same manner as sweet whole milk which is used for producing butter and/or cheese.

Salts of the type which we have disclosed hereinbefore and which will be disclosed hereinafter may also be added to milk and cream as prophylactic means to keep the dairy products from becoming sour. In many milk processing plants, whole milk, skim milk, and other milk products turned slightly sour or quite sour for various reasons. In these cases, it is possible to retard the heretofore rapid formation of lactic acid due to a bacterial disintegration, by the addition of small amounts of hydrogen peroxide, or other peroxides as for instance soduim perpyrophosphate, e.g. $Na_4P_2O_8$ or $Na_4P_2O_7.H_2O_2$, or potassium perphosphate $K_3PO_5$, or agglomeration products of $K_2O_3$ and $KPO_3$. Hydrogen peroxide addition compounds such as $Na_4P_2O_7.H_2O_2$ or $Na_4P_2O_7.3H_2O_2$ are also known as "phosphate peroxidates" or "phosphate oxyhydrates." The terms "perphosphate," "perpyrophosphate" and the like when used throughout this specification are to mean hydrogen peroxide addition compounds of the formula, for example, $K_4P_2O_8$ and also $$K_4P_2O_7.H_2O_2$$

Before the formation of lactic acid due to bacterial activity takes place, the salts or mixtures of salts used in practicing our invention may be added to the whole milk or other types of sweet milk including cream. Here the water of crystallization of these salts is replaced entirely or in part by hydrogen peroxide. This addition results in temporarily delaying the action of the lactic acid formers and at the same time, the additions have a stabilizing action on the milk casein. Salts such as perorthophosphates, perpyrophosphates, condensed perphosphates or citrates, lactates, tartrates, and the like, to which hydrogen peroxide is agglomerated can be used. This particular phase of our invention is applicable to all kinds of milk or milk preparations, or creams of milk which contain flocculated milk casein and/or the milk casein of which is to be stabilized before flocculation, for instance for the run off of buttermilk from normal butter production.

Our new process is especially suitable for processing buttermilk into cheese. Until now, this has not been possible. Buttermilk can not be caseated by the rennet process in large amounts with normal or slightly sour or even very sour tank milk. By this process, the flocculated and suspended milk casein present in the milk is adjusted by the addition of the various named salts to a pH value of about 5.5 to about 6. In this process, disodium phosphates, sodium tripolyphosphates mixed with dipotassium phosphates or citrates, tartrates, and the like are suitable. The buttermilk is then heated to about 40° C. and is held for 5 minutes at this temperature with continuous agitation going on during the holding period. In order to prevent too rapid development of the lactic acid formers, a little hydrogen peroxide is added and this temporarily avoids an after acidification and makes possible caseating the buttermilk which is now similar to normal skim milk, in for instance 50% proportions to the normal or slightly sour or entirely sour tank milk.

*Example 5*

100 liters of buttermilk having a fat content of 0.3% and 400 liters of tank milk with a fat content of 1% are to be made into a Limburger cheese having a 20% fat content.

To 100 liters of buttermilk 300 grams of a mixture of sodium tripolyphosphate and potassium orthophosphate (adjusted to pH 9) are added. The buttermilk is heated to between 38 and 39° C. accompanied by continuous stirring. When the temperature of 39° C. has been reached, 10 cc. of a 7.5% or 25 cc. of a 3% hydrogen peroxide solution are added and the whole is left to stand at 38°–39° C. for 5 to 8 minutes with continuous agitation. Then the 400 liters of tank milk having a fat content of 1%, and 100–200 cc. of a 7.5% of hydrigen peroxide solution are added with vigorous stirring. After three minutes, rennet is thereafter added to the batch.

In addition to the foregoing process for treating milk and cream in the manufacture of cheese, we have found that the method can be advantageously applied to the treatment of cheese substances produced by this method, after refreshening these substances. The best known example is cheddar cheese wherein the already salted cheese substance is ground, treated with salt and subsequently pressed into desired shapes. This type of salting process may be applied to the manufacture of other cheeses which are ground and pressed into shape. We have found experimentally that it is important in this process, for what we call a direct salting as contrasted with the indirect salting from the outside of the formed cheeses, to add the salts used in our process in accordance with this invention. While this method relates primarily to different types of natural cheese which are on the market, particular advantages are obtained when melting raw material is used in the production of melting cheeses. As is known in the art, a certain concentration of salt solution must be present in order to obtain the right ripening of the cheese. When these cheeses are melted, they obtain a renewed addition of about 2 to 4% of melting salts and thereby the salt concentration in the final product will become relatively high.

We have found in the case of cheese substances made in accordance with our basic invention, a proper ripening of the cheese is obtained and the above indicated additional melting salt can be eliminated when the cheese is salted immediately after manufacture not with sodium chloride or common salt, but with the condensed phosphates, citrates, tartrates, and other salts disclosed by us herein. In this particular aspect of our invention, the salts and salt mixtures selected are those which will produce a pH value of between 5 to 5.5, these pH values being particularly advantageous for the ripening of the cheese.

As has hereinbefore been explained, we have found that in the manufacture of cheese, the process can be substantially simplified and accelerated in those cases where the milk and/or cream was brought by buffering to the pH value of 5.2 to 6.0, after being refreshed, the cheese substance reaching the desired consistency, the whey being discharged, and the cheese product formed and packed without subsequent discharge of liquid therefrom.

We have also found that our process of treating normaly unacidulated and/or acidulated milk or cream with the named salts alone or in combination, to a pH value of 5.2 to 6.0 materially shortens the time consuming processes formerly employed. The process which required at least 4 hours, by our methods is reduced to about 1 hour thus effecting certain economies. The refreshing process, formerly accelerated in an undesired manner by excessive acidification thus making the cheese substance tough and sticky and discharging excessive volumes of whey, we have found that by cooling the cheese product with cold water and/or by the addition of ice, holding the cheese at the desired pH value, or by adding small amounts of hydrogen peroxide, these difficulties can be eliminated.

The cheese substance obtained in accordance with our process tends to be granular or gritty, but it will assume a pudding-shaped form after its processing within half a day and can then be used in its fresh state or can be subjected to a ripening process. It is also possible and indeed advantageous to work into the cheese, salts, spices, and other additives according to the cheese making art. The cheese thus made can be supplied to the consumer in its fresh state or ripened by special methods such as cellar treatment, etc.

What we claim as new and for which we desire to secure Letters Patent is:

1. A method of treating sour milk and cream used in the production of butter and cheese therefrom which comprises adding to the milk and cream an effective amount of at least one of the water soluble salts of the group consisting of orthophosphates, condensed phosphtaes, citrates, tartrates, lactates, ascorbates and amino acid salts, whereupon the milk casein is stabilized the amount of said salt being insufficient to raise the pH above the acid range, and thereafter liquefying said flocculated milk casein prior to the customary thermal treatment thereof.

2. The method as described in claim 1 where the range of the pH value maintained by said additions is of about 5.5 to 6.45.

3. The method as described in claim 1 where hydrogen peroxide is also added to the milk and cream.

4. The method as described in claim 1 where an effective amount of a compound selected from the group consisting of perphosphates, perpolyphosphates, phosphate peroxidates, and polyphosphate peroxidates is also added.

5. A method of treating milk and cream used in the production of butter and cheese therefrom which comprises adding to the milk and cream an effective amount of at least one of the alkali metal water soluble salts of the group consisting of orthophosphates, condensed phosphates, citrates, tartrates, lactates, ascorbates and amino acid salts, the water of crystallization of which alkali metal water soluble salt is to some extent replaced by hydrogen peroxide prior to the addition of said alkali metal water soluble salt to the milk and cream.

References Cited in the file of this patent

UNITED STATES PATENTS

| | | |
|---|---|---|
| 1,676,121 | Heide | July 3, 1928 |
| 2,251,496 | Parsons | Aug. 5, 1941 |
| 2,311,598 | Schwartz | Feb. 16, 1943 |
| 2,758,925 | Jensen | Aug. 14, 1956 |

UNITED STATES PATENT OFFICE
CERTIFICATION OF CORRECTION

Patent No. 2,977,232                              March 28, 1961

Albert Meyer et al.

It is hereby certified that error appears in the above numbered patent requiring correction and that the said Letters Patent should read as corrected below.

Column 4, line 37, for "not" read -- now --; column 5, lines 42 and 43, for "normaly" read -- normal --.

Signed and sealed this 15th day of August 1961.

(SEAL)
Attest:

ERNEST W. SWIDER                           DAVID L. LADD

Attesting Officer                             Commissioner of Patents